United States Patent [19]

Yokomizo et al.

[11] Patent Number: 5,229,156
[45] Date of Patent: Jul. 20, 1993

[54] FLAVOR OIL AND PROCESS FOR PRODUCING THE SAME

[75] Inventors: Futoshi Yokomizo, Izumisano; Masaaki Miyabe, Sennan; Yoichi Tashiro, Sennan; Masahiro Furukawa, Sennan, all of Japan

[73] Assignee: Fuji Oil Company, Limited, Osaka, Japan

[21] Appl. No.: 967,533

[22] Filed: Oct. 27, 1992

Related U.S. Application Data

[63] Continuation of Ser. No. 714,609, Jun. 13, 1991, abandoned.

[30] Foreign Application Priority Data

Jun. 21, 1990 [JP] Japan ................................. 2-164986

[51] Int. Cl.$^5$ ............................................. A23L 1/226
[52] U.S. Cl. ..................... 426/533; 426/613; 426/650
[58] Field of Search ...................... 426/333, 650, 613

[56] References Cited

PUBLICATIONS

Patent Abstracts of Japan, vol. 13, No. 275, Abstracting Japanese Kokai 62-226973, Published Jun. 23, 1989.
Patent Abstracts of Japan, vol. 13, No. 372 (C-627) (3720), Aug. 17, 1989.
Patent Abstract of Japan, vol. 9, No. 134 (C-285) (1857), Jun. 8, 1985.
Patent Abstracts of Japan, vol. 11, No. 184 (C-427) (2631), Jun. 12, 1987.

*Primary Examiner*—Joseph Golian
*Attorney, Agent, or Firm*—Wenderoth, Lind & Ponack

[57] ABSTRACT

A flavor oil comprising a fat or oil and an oil-soluble component derived from a sugar-heat treated dairy product powder which is obtained by subjecting a mixture of 1 to 20 parts by weight of a reducing sugar and 100 parts by weight of the dairy product powder to a heat treatment in the presence of 1 to 15% by weight of water is used as a flavor oil. The oil soluble component can be produced by dipping the above sugar-heat treated dairy product powder in a fat or oil, subjecting the resultant product to a heat treatment at a temperature of 90° to 150° C. under reduced pressure of not higher than 60 mmHg, and then removing solids.

3 Claims, No Drawings

FLAVOR OIL AND PROCESS FOR PRODUCING THE SAME

This application is a continuation of now abandoned application, Ser. No. 07/714,609 filed Jun. 13, 1991, now abandoned.

FIELD OF THE INVENTION

The present invention relates to a flavor oil and a process for producing the same. More particularly, it relates to a flavor oil with good body which is the bases for the taste of fats and oils per se, and a process for producing the same. The flavor oil of the present invention can be used widely and is not limited to an edible fat or oil having a specific taste.

BACKGROUND OF THE INVENTION

In general, edible fats and oils purified by a conventional method are almost tasteless and odorless in comparison with special fats and oils such as sesame oil, olive oil, cacao butter and the like. An oil produced by flavoring or seasoning such a purified edible fat or oil has been known and is referred to as a "flavor oil" or "seasoning oil". For producing such a flavor oil or seasoning oil, there have been proposed various methods. For example, the proposed methods include a method for producing a flavor oil having a characteristic flavor of Chinese dishes such as pan-fry or deep-fry dishes which comprises adding fennel, Welsh onion and garlic into a fat or oil heated with flames having strong caloric force to extract their essence sufficiently, lowering the temperature, adding pepper to the mixture to further extract their essence and then filtering off the oil (Japanese Patent Kokoku No. 57-58901); a method for producing flavor oils having various flavors which comprises cutting or grinding vegetables having a water content of 60% or higher, for example, such as cabbage, lettuce, ginger, garlic, Welsh onion and the like into pieces of less than 2 mm in thickness, adding the vegetables to a fat or oil, maintaining the mixture at 110° to 160° C. and then collecting the oil phase (Japanese Patent Kokoku No. 59-4972); a method for producing a seasoning oil for various dishes such as steak, sukiyaki, sauteed vegetables, Chinese noodles, Chinese-style hotchpotch, gratin, soup and the like which comprises dipping raw materials to be treated such as vegetables into a heated oil in a cooker to conduct a heat treatment and, at the same time of heating, subjecting the mixture to a treatment at reduced pressure under constant conditions to dissolve their essence, flavors and other ingredients in the oil and then taking the oil out from the cooker (Japanese Patent Kokai No. 60-19449): and a method for producing flavor oils having various flavors which comprises subjecting an admixture of a fat or oil and raw materials such as vegetables, meat, fowl, fishery products, seaweeds, spices, beans, a processed product thereof or a mixture thereof with a flavoring material such as a brewed product, to heat treatment under a normal pressure, and then subjecting the resultant product to a heat treatment under pressure (Japanese Patent Kokai No. 62-6651).

All of these conventional methods for producing a flavor oil or seasoning oil utilize flavor components possessed by the flavoring materials such as flavor, smell and the like and, although the flavor oils themselves are good products, they have their own peculiar flavors and, therefore, there is a disadvantage that their uses are limited.

On the other hand, apart from a flavor oil or seasoning oil, although edible fats and oils purified by a conventional method are almost tasteless and odorless as described above, in fact, they have their own peculiar oily flavor. For example, in general, a liquid oil has a peculiar fatty flavor and palm oil has a peculiar powdery flavor. Therefore, there is a disadvantage that they have unpleasant oily flavor, and such an unpleasant oily flavor increases with time.

Further, as a frying oil, for example, there can be normally used soybean oil, rapeseed oil, palm oil, palm soft oil and the like. However, these oils contain a large amount of unsaturated acids as the constituent fatty acids and, therefore, peroxides, carbonyl compounds and the like are formed during frying and there is a problem of thermal oxidation stability. For solving this problem, for example, hardening of these oils can normally be employed to improve thermal oxidation stability and storage oxidation stability. However, when using these hardened oils (hydrogenated oils) for frying, there is a disadvantage that a peculiar smell is formed by hardening and, therefore, it is not preferred in view of flavor.

OBJECTS OF THE INVENTION

The main object of the present invention is to solve the disadvantages as described above, namely, the limitation of the use of a conventional flavor oil or seasoning oil due to its peculiar flavor, unpleasant oily flavor of edible fats and oils, peculiar smell of hardened oil, and increase in hardening smell with time.

Further, another object of the present invention is to increase the production of a fat or oil having good body derived from milk fat, in view of the usefulness of resources of milk fat.

These objects as well as other objects and advantages of the present invention will become apparent to those skilled in the art from the following description.

SUMMARY OF THE INVENTION

According to the present invention, there is provided a flavor oil comprising an oil-soluble component derived from a sugar-heat treated dairy product powder which is obtained by subjecting a mixture of 1 to 20 parts by weight of a reducing sugar and 100 parts by weight of the dairy product powder to a heat treatment in the presence of 1 to 15% by weight of water. The present invention also provides a process for producing a flavor oil which comprises dipping a sugar-heat treated dairy product powder in a fat or oil, subjecting the resultant product to a heat treatment at a temperature of 90° to 150° C. under reduced pressure of not higher than 60 mmHg (60 Torr) and then removing solids, said sugar-heat treated dairy product powder being obtained by admixing 1 to 20 parts by weight a reducing sugar with 100 parts by weight of the dairy product powder and subjecting the mixture to a heat treatment in the presence of 1 to 15% by weight of water.

DETAILED DESCRIPTION OF THE INVENTION

The sugar-heat treated dairy product powder in the present invention is described in detail in the present assignee's Japanese Patent Application No. 62-226973. Examples of the dairy product powder to be treated include whole milk powder, skimmed milk powder, sugared milk powder, modified whole milk powder, modified skimmed milk powder product and the like. Examples of the reducing sugar include glucose, fructose, galactose, xylose, maltose and the like.

The mixing ratio of the reducing sugar is 1 to 20 parts by weight based on the 100 parts by weight of the dairy product powder. When the mixing ratio of the reducing sugar is lower than the above lower limit, the desired effect is scarcely expected. When it exceeds the above upper limit, excess sweetness of the reducing sugar and, at the same time, viscosity is increased, which results in deterioration of workability, and such excess mixing ratio is therefore not preferred.

Upon the heat treatment, the amount of water in the mixture of the dairy product powder and the reducing sugar is adjusted to 1 to 15% by weight. When the water content is lower than the above lower limit, the desired effect is scarcely expected. When the water content exceeds the above upper limit, viscosity is increased, which results in deterioration of workability and, further, it takes much more time than it needs. Further, the above-described dairy product powder normally contains water up to about 5% by weight and, therefore, in some case, water may not be added.

The heating temperature may be about 70° to 120° C. and, in a low temperature range, the desired effect can be obtained by treating for a longer period of time (e.g. for about 10 hours at 70° C.) and, in a high temperature range, the desired effect can be obtained by treating for a shorter period of time (e.g. for about 10 minutes at 120° C.). The degree of intensity of flavor can be adjusted according to the degree of treatment. When the temperature is lower than the above lower limit, production efficiency becomes inferior. When the temperature exceeds the above upper limit, good flavor can hardly be formed.

The heating apparatus may be an internal heating and mixing apparatus equipped with a mixing blade and a vacuum device (e.g., vacuum kneader) and, by using such an apparatus, a mixture of the dairy product powder, the reducing sugar and the like is subjected to the heat treatment with mixing.

Further, when a small amount of water is added to the dairy product powder, the resulting treated material is liable to become lumpy. In order to prevent this, it is preferred that sugar or powdered sugar is added within an acceptable range. It is effective to add sugar or powdered sugar in an amount of 5 to 50 parts by weight based on 100 parts by weight of the dairy product powder. Further, when the fat content of the dairy product powder is lower, for example, in the case of treating skimmed milk powder, a suitable amount (the amount calculated as whole milk powder) of a vegetable fat or oil can be added to increase a heat transfer coefficient upon reaction as well as to reduce lumps remaining in the treated material.

When the heat treatment is completed, water is removed under reduced pressure, followed by cooling. Lumps are present in this cooled material and, therefore, it is appropriately pulverized by a pulverizer.

The sugar-heat treated dairy product powder thus obtained has a characteristic caramel-like flavor which is completely different from an untreated milk powder. By subjecting the milk powder to the sugar-heat treatment as described above, good and characteristic flavor is produced. To the contrary, if milk powder which is not subjected to the sugar-heat treatment is used for flavoring, the resulting flavor become weak, and it is not preferred.

According to the present invention, the dairy product powder subjected to the sugar-heat treatment as described above can itself be used as the flavor oil of the invention, and it is diluted with a fat or oil upon use. Or, it can be added to a fat or oil in an amount of 0.01 to 20% by weight to obtain the flavor oil of the present invention. In many cases, when the dairy product powder subjected to the sugar-heat treatment is added to a fat or oil in an amount of 0.1% by weight or more, the desired result can be obtained. For enhancing the flavor, in general, the dairy product powder is added to a fat or oil in an amount of 2% by weight or more. The dairy product powder can be added in an amount of 10% by weight or more to produce concentrated flavor, and then, it can be diluted with a normal fat or oil upon use.

Thus, a fat or oil to which the dairy product powder subjected to the sugar-heat treatment as described above is added, is mixed with heating under reduced pressure. Regarding the conditions of pressure reduction, it is necessary that the degree of vacuum is not higher than 60 mmHg (60 Torr). When the degree of vacuum exceeds 60 mmHg, oxidation stability is liable to become inferior. Further, it is necessary that the heating temperature is 90° to 150° C. When the temperature is lower than the above lower limit, the desired effect is scarcely obtained and, when the temperature exceeds the above upper limit, a burned smell is formed. The heating time is not specifically limited and it may be about 2 hours, and the period of time scarcely influences the above treatment.

Then, the material thus treated is cooled and separated into an oil and solids by conventional separation means such as filtration, centrifugation, decantation or the like to give a flavor oil.

Examples of the fat or oil used in the present invention which is flavored by the dairy product powder subjected to the sugar-heat treatment include vegetable fats and oils such as rapeseed oil, soybean oil, sunflower seed oil, cotton seed oil, peanut oil, corn oil, safflower oil, kapok oil, evening primrose oil, palm oil, shea fat, sal fat, coconut oil, palm kernel oil and the like and animal fats and oils such as beef tallow, lard, fish oil, whale oil and the like, and the above fats and oils may be used alone or in combination thereof. They may also be processed fats and oils or synthesized fats and oils which are subjected to hardening, fractionation, interesterification and the like, and a wide range of fats and oils from liquid oils to fats and oils having high melting points can be used. These fats and oils are preferably purified fats and oils. Particularly, palm oil, palm olein, hydrogenated soybean oil or hydrogenated rape seed oil is preferred, and the flavor oils of these fats or oils have good body which is similar to that of milk fat and, at the same time, have excellent oxidation stability in comparison with milk fat.

As described above, the flavor oil obtained according to the present invention is not limited to a special oil, and shows good body as the flavor bases of fats and oils per se. Further, it can be widely used. For example, it can be used as fats and oils which are suitable for uses of various foods such as frying, spraying, margarine, shortening, kneading, cream and the like.

Thus, according to the present invention, it is possible to apply good body to fats and oils such as liquid oil which have been considered to be oily and palm oil, and it also became possible to mask hardening smell of hardened oils.

The following Examples and Comparative Examples further illustrate the present invention in detail but are not to be construed to limit the scope thereof. In the Examples and Comparative Examples, all "parts" and "percents" are by weight unless otherwise stated.

EXAMPLE 1

To a mixture of whole milk powder (90 parts) and glucose (5 parts) was added water (5 parts) and the mixture was subjected to a heat treatment with mixing at 100° C. for one hour, dehydrated under reduced pressure and cooled to obtain a crude powder material. Then, the crude powder material was pulverized to obtain a sugar-heat treated dairy product powder having an average particle size of 0.5 mm. This sugar-heat treated dairy product powder (1 part) was mixed with purified hardened palm oil (20 parts) (ascending melting point: 30° C.) and the mixture was mixed with heating at 90° C. for 2 hours under vacuum of about 60 mmHg, cooled to about 60° C. and separated into an oil and solids to obtain the desired flavor oil.

Doughnuts were fried by using this flavor oil and purified hardened palm oil, and taste and flavor thereof were tested organoleptically by 20 panelists. As a result, 20 panelists pointed out that the flavor oil was very good, support the conclusion that the flavor oil obtained in this example was extremely superior.

COMPARATIVE EXAMPLE 1

According to the same manner as that described in Example 1, an oil product was obtained except that whole milk powder (1 part) was mixed with purified hardened palm oil (20 parts). Doughnuts fried using this treated oil lacked aroma.

COMPARATIVE EXAMPLE 2

According to the same manner as that described in Example 1, an oil product was obtained except that the mixing with purified hardened palm oil was conducted at 70° C. As a result, the intensity of flavor was weak in comparison with the product of Example 1.

COMPARATIVE EXAMPLE 3

According to the same manner as that described in Example 1, an oil product was obtained except that the mixing with purified hardened palm oil was conducted at 160° C. As the result, a burned smell was present in the product.

EXAMPLE 2

To a mixture of whole milk powder (70 parts), granulated sugar powder (25 parts) and glucose (5 parts) was added water (5 parts) and the mixture was subjected to heat treatment with mixing at 95° C. for 80 minutes, dehydrated under reduced pressure and cooled to obtain a crude powder material. In comparison with Example 1, the particle size of this crude powder was smaller. Then, the crude powder material was pulverized to obtain a sugar-heat treated dairy product powder having an average particle size of 0.5 mm.

This sugar-heat treated dairy product powder (1 part) was mixed with purified hardened rape seed oil (20 parts) (ascending melting point: 35° C.) and the mixture was mixed with heating at 120° C. for 90 minutes under vacuum of about 5 mmHg, cooled to 60° C. and separated into an oil and solids to obtain the desired flavor oil.

Candies were produced by using this flavor oil and purified hardened rape seed oil and taste and flavor thereof were tested organoleptically by 20 panelists. As a result, 17 panelists pointed out that the flavor oil was superior, 2 panelists pointed out that purified hardened rape seed oil was superior and 1 panelist pointed out that both were not superior. These results support the conclusion that the flavor oil obtained in this example was extremely superior.

What is claimed is:

1. A process for producing a flavor oil, which comprises:
   admixing 1 to 20 parts by weight of a reducing sugar with 100 parts by weight of a dairy product powder,
   subjecting the resultant mixture to a heat treatment at about 70° to 120° C. for about 10 minutes to about 10 hours in the presence of 1 to 15% by weight of water to produce a sugar-heat treated dairy product powder,
   dipping the sugar-heat treated dairy product powder in a fat or oil,
   subjecting the resultant product to a heat treatment at a temperature of 90° to 150° C. for 90 minutes to 2 hours under reduced pressure of not higher than 60 mmHg, and
   removing solids from the fat or oil.

2. A process for producing a flavor oil according to claim 1, wherein the reducing sugar is a member selected from the group consisting of glucose, fructose, galactose, xylose and maltose.

3. A process for producing a flavor oil according to claim 1, wherein the dairy product powder is a member selected from the group consisting of whole milk powder, skimmed milk powder, sugared milk powder, modified while milk powder and modified skimmed milk powder.

* * * * *